(12) United States Patent
Miura et al.

(10) Patent No.: US 7,538,463 B2
(45) Date of Patent: May 26, 2009

(54) VIBRATOR

(75) Inventors: Naoki Miura, Fujiyoshida (JP); Takahisa Watanabe, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 0 days.

(21) Appl. No.: 11/650,256

(22) Filed: Jan. 5, 2007

(65) Prior Publication Data
US 2007/0182257 A1 Aug. 9, 2007

(30) Foreign Application Priority Data

Jan. 10, 2006 (JP) .............................. 2006-002127
Feb. 3, 2006 (JP) .............................. 2006-026447

(51) Int. Cl.
*H02K 33/00* (2006.01)

(52) U.S. Cl. .............................. 310/81; 310/15; 310/16; 310/17; 310/18

(58) Field of Classification Search .................. 310/12, 310/15, 16, 17, 18, 20, 21, 22, 23, 24, 36
See application file for complete search history.

(56) References Cited

U.S. PATENT DOCUMENTS 4,836,631 A * 6/1989 Shimazu et al. ............. 359/218

6,753,630 B1 * 6/2004 Ueda et al. .................... 310/81
2003/0036364 A1 2/2003 Chung

FOREIGN PATENT DOCUMENTS

| JP | 2003-80171 | 3/2003 |
|---|---|---|
| JP | 2004-261684 | 9/2004 |
| JP | 2005-156486 | 6/2005 |
| JP | 2006-325198 | 11/2006 |
| JP | 2006-333273 | 12/2006 |
| WO | WO 2005/004310 | 1/2005 |

* cited by examiner

*Primary Examiner*—Quyen P Leung
*Assistant Examiner*—Bryan P Gordon
(74) *Attorney, Agent, or Firm*—Brinks Hofer Gilson & Lione (57) ABSTRACT

A vibrator includes a voice coil and a vibrating member supported by first and second suspensions so as to be vibratory in the axial direction of the coil. Each of the first and second suspensions has an inner ring portion fixed to the vibrating member and an outer ring portion fixed to a casing of the vibrator. The inner and outer ring portions are connected through arcuate portions. Each arcuate portion has a first end connected to the inner ring portion and a second end connected to the outer ring portion. The arcuate portions of the first and second suspensions extend from the first end to the second end, respectively, in the same circumferential direction as seen from one side of the axial direction.

20 Claims, 8 Drawing Sheets

VIBRATOR

This application claims priority under 35 U.S.C. §119 to Japanese Patent Application Nos. JP2006-002127 filed Jan. 10, 2006, and JP2006-026447 filed Feb. 3, 2006, the entire content of which is hereby incorporated by reference.

BACKGROUND OF THE INVENTION

1. Field of the Invention

The present invention relates to a vibrator that may be incorporated in a small-sized device such as a cellular phone, a watch and other portable devices. More particularly, the present invention relates to a vibrator used in a cellular phone, e.g. to inform the user of an incoming call.

2. Description of the Related Art

Figure 8:
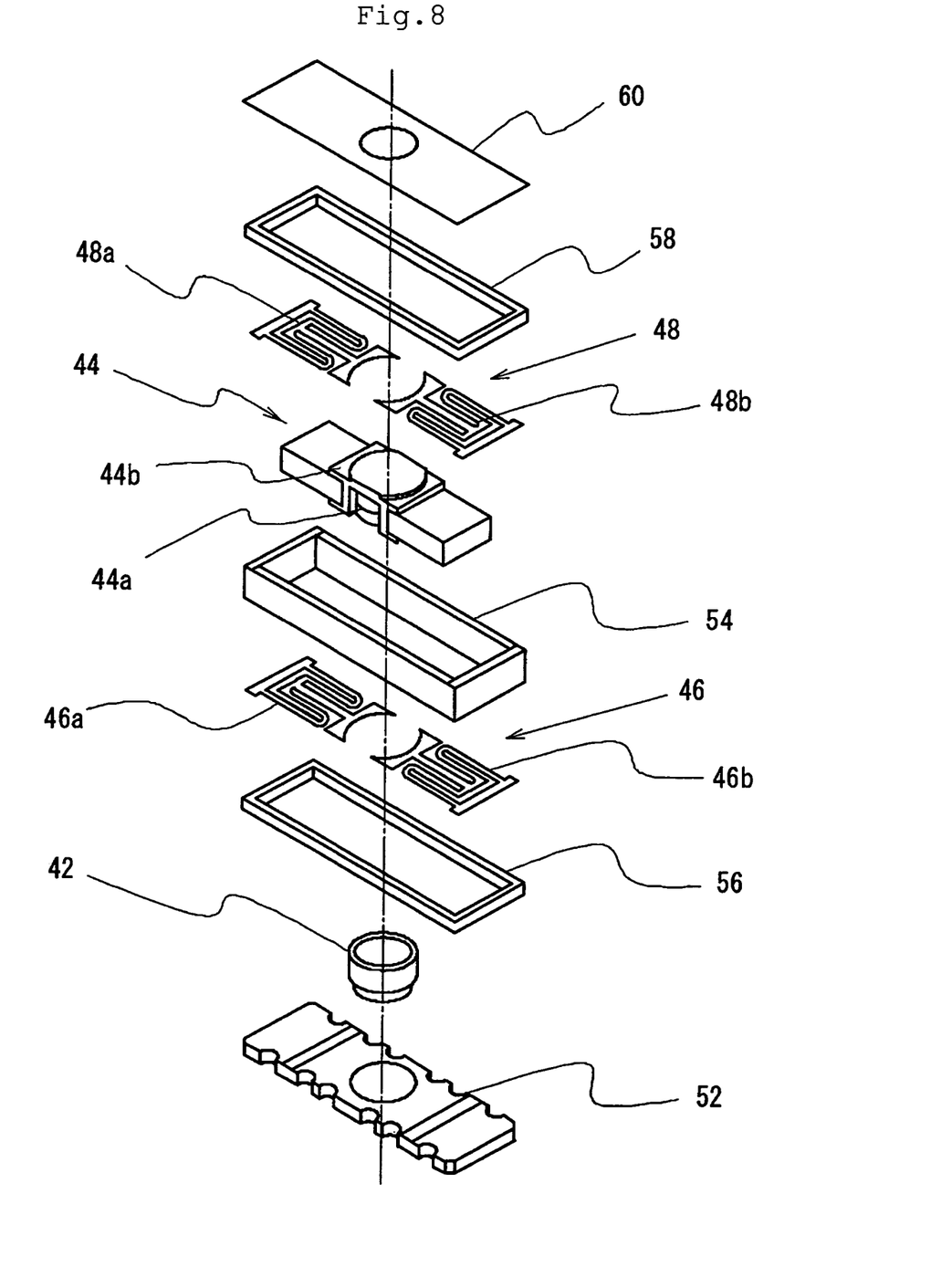
FIG. 8 is an exploded perspective view showing another conventional vibrator.

Conventionally, a portable terminal device such as a cellular phone has a vibrator incorporated therein as a device that informs a user of an incoming call by vibrations of the phone body. Regarding the vibrator, there has been a demand for miniaturization. Under these circumstances, the present applicant proposed a small-sized vibrator as shown in FIG. 8 (see Japanese Patent Application Publication No. 2004-261684).

The proposed vibrator includes a voice coil 42 and a vibrating member 44 having a magnet 44a to be disposed in the coil 42 and a yoke 44b facing the magnet 44a across the coil 42. The vibrator further includes suspensions 48 and 46 that resiliently support the vibrating member 44. When the voice coil 42 is supplied with an alternating current, the vibrating member 44 is reciprocated in the axial direction of the voice coil 42, thereby generating vibrations.

The suspensions 46 and 48 comprise pairs of leaf spring members 46a, 46b and 48a, 48b respectively. Each of the leaf spring members 46a, 46b, 48a and 48b has one end thereof fixed to a casing (described below). Each of the other ends of the leaf spring members 46a, 46b, 48a and 48b is attached to the yoke 44b in order to resiliently support the vibrating member 44.

The voice coil 42, the vibrating member 44 and the suspensions 46 and 48 are housed in a casing having a frame 54 surrounding the vibrating member 44. The casing further has a first end plate 52 to which the voice coil 42 is fixed and which closes one opening of the frame 54 and a second end plate 60 closing the other opening of the frame 54. The first end plate 52 is formed as a printed wiring board having a wiring pattern connected to the voice coil 42 and terminals. Further, the casing has a spacer 56 between the frame 54 and the first end plates 52 and has another spacer 58 between the frame 54 and the second end plate 60. One end of each of the leaf spring members 46a and 46b is secured between the frame 54 and the spacer 56. One end of each of the leaf spring members 48a and 48b is secured between the frame 54 and the spacer 58.

Figure 6:
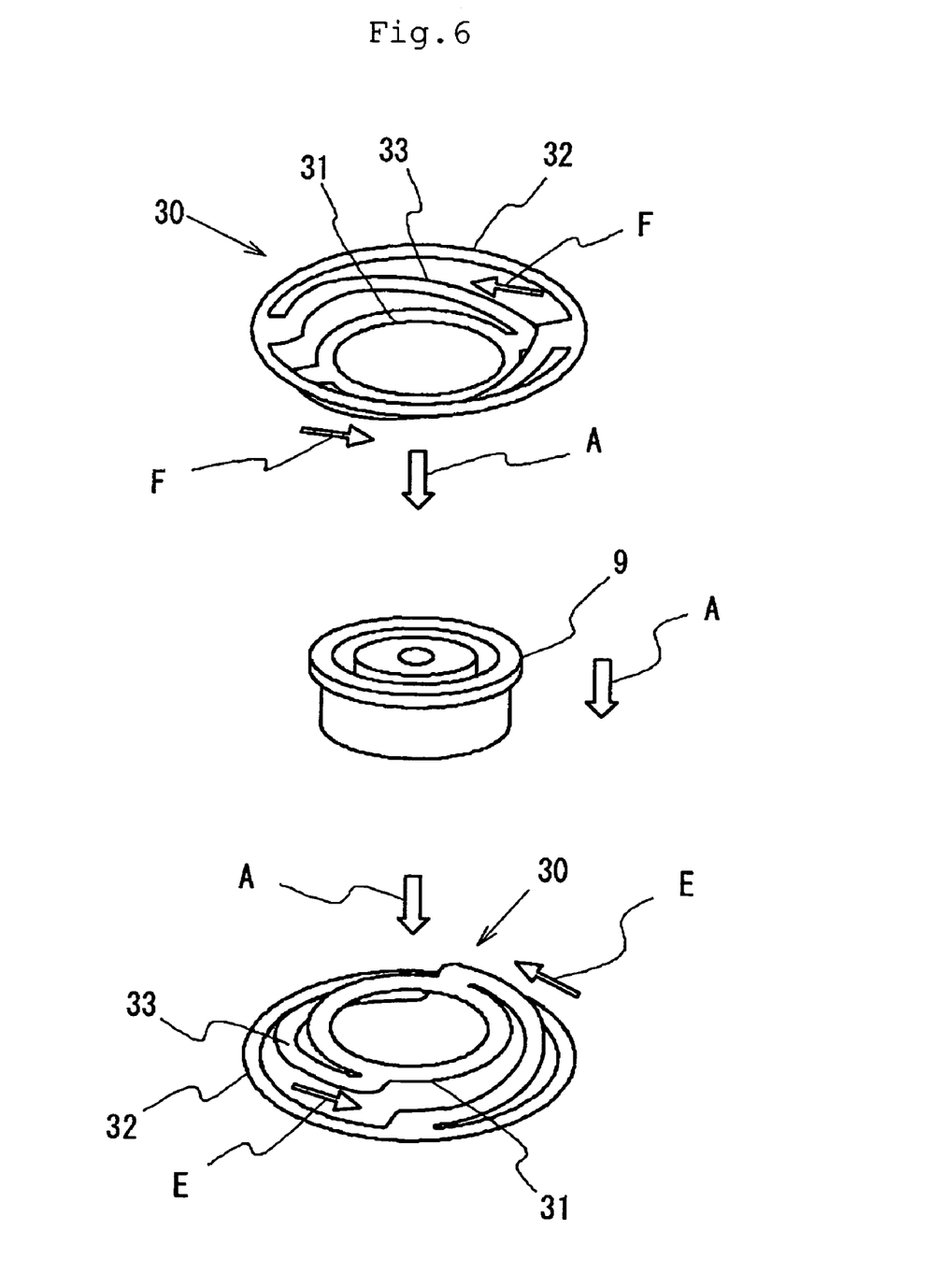
FIG. 6 is a perspective view showing the way in which spiral leaf springs are disposed in a conventional vibrator.

As another example of the suspension structure that resiliently supports a vibrating member, a spiral leaf spring as shown in FIG. 6 has been developed. The spiral leaf spring 30 has an inner ring portion 31 and an outer ring portion 32 shifted in the axis direction thereof relative to the inner ring portion 31. Arcuate portions 33 are set between the inner ring portion 31 and the outer ring portion 32. One end of each arcuate portion 33 is connected to the inner ring portion 31, and the other end thereof is connected to the outer ring portion 32. A pair of such spiral leaf springs 30 is disposed at both axial ends of a vibrating member 39. The inner ring portions 31 of the two spiral leaf springs 30 are respectively fixed to two end surfaces of the vibrating member 39, and the outer ring portions 32 of the leaf springs 30 are fixed to a casing (not shown), thereby resiliently supporting the vibrating member 39.

Therefore, in this case, the spiral directions of the arcuate portions 33 of the spiral leaf spring 30 (i.e. the directions of extension of the arcuate portions 33 from their joints with the associated outer ring portions 32 to their joints with the associated inner ring portions 31) are opposite to each other as seen from one side of the axial direction of the vibrating member 39. Accordingly, when the vibrating member 39 moves in one axial direction, e.g. the direction indicated by the arrow A in FIG. 6, the arcuate portions 33 of one spiral leaf spring 30 (the lower spiral leaf spring 30 as seen in FIG. 6) behave so as to expand in a circumferential direction indicated by the arrow E in FIG. 6, whereas the arcuate portions 33 of the other spiral leaf spring 30 (the upper spiral leaf spring 30 in FIG. 6) behave so as to contract in a circumferential direction indicated by the arrow F in FIG. 6. Consequently, the vibrating member 39 slightly rotates about its own axis. When the vibrating member 39 moves axially in the opposite direction to the above, the arcuate portions 33 of the two spiral leaf springs 30 behave opposite to the above. Accordingly, the vibrating member 39 vibrates around its own axis as it reciprocates.

Figure 7:
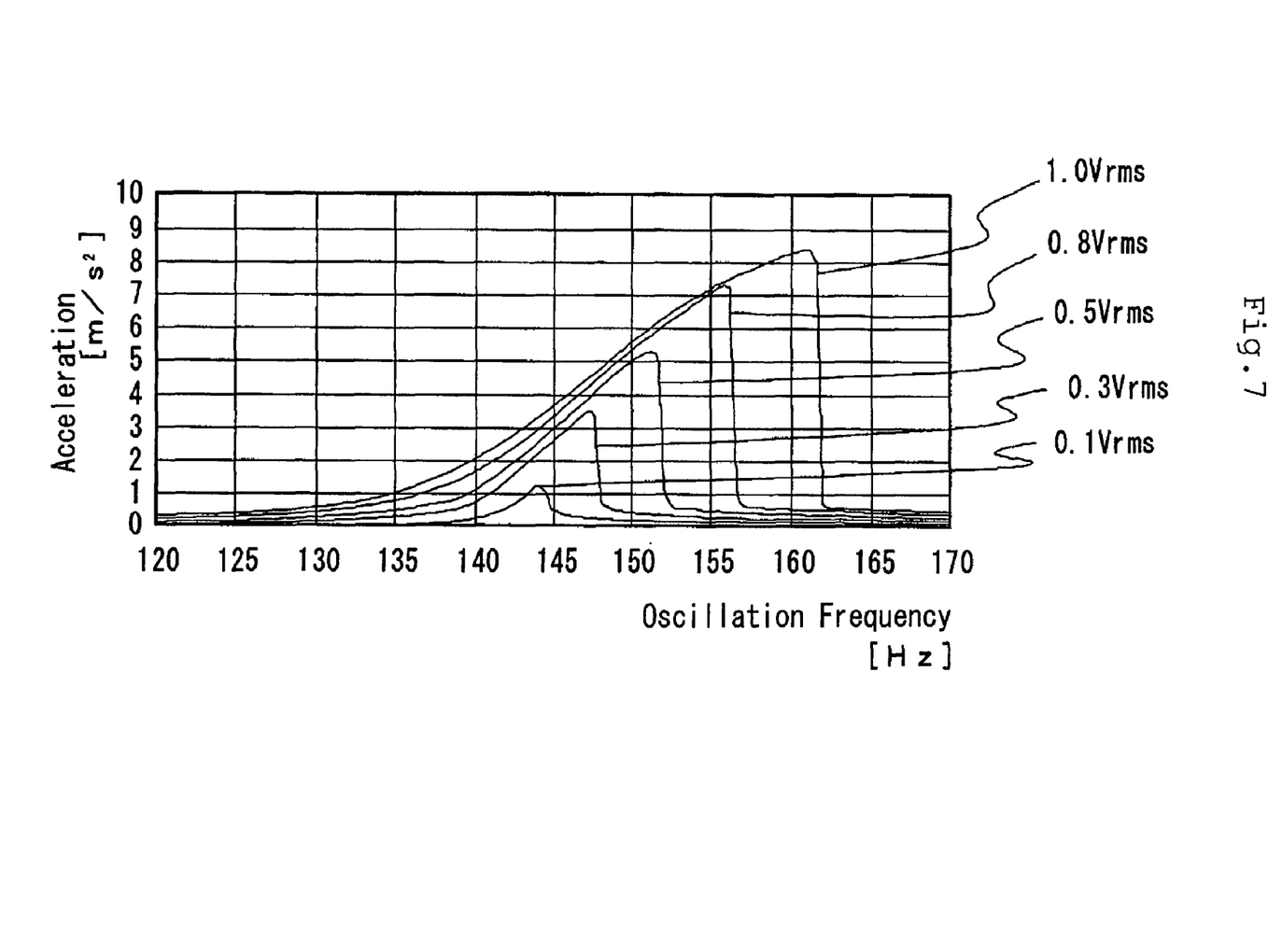
FIG. 7 is a graph showing the relationship between the acceleration and oscillation frequency of the vibrating member vibrated by the voice coil with respect to the voltage input to the voice coil of the conventional vibrator.

In the vibrator having the vibrating member 39 supported with the pair of ring-shaped spiral leaf springs 30 as stated above, the frequency at which a resonance occurs varies undesirably. FIG. 7 is a graph showing the relationship between the frequency and acceleration of such a vibrator with respect to the input voltage. As will be understood from FIG. 7, the vibrator in question suffers a change in resonance frequency in response to a change of the input effective voltage. This may be caused by the above-described behavior of the pair of leaf spring 30.

Thus, the vibrator using a pair of spiral leaf springs 30 as stated above cannot stably obtain large vibrations using resonance. Hence, it is difficult to surely inform a user of an incoming call when this vibrator is applied to a cellular phone.

SUMMARY OF THE INVENTION

Accordingly, an object of the present invention is to provide a vibrator having good linearity in frequency characteristics and capable of surely informing a user of an incoming call when it is incorporated in a cellular phone.

The present invention provides a vibrator including a voice coil and a vibrating member adapted to vibrate along the axial direction of the voice coil upon application of an alternating current to the voice coil. The vibrator also includes first and second suspensions, which are disposed to sandwich the vibrating member from both sides thereof in the axial direction so as to support the vibrating member vibratably in the axial direction. The vibrator further includes a casing that houses the voice coil, the vibrating member, and the first and second suspensions. The first suspension has an inner ring portion fixed to the vibrating member and an outer ring portion that is coaxial with the inner ring portion and has a larger diameter than the inner ring portion. The outer ring portion is fixed to the casing at a position spaced apart from the vibrating member in the axial direction. The first suspension further has at least a pair of arcuate portions disposed in an annular space between the inner ring portion and the outer ring portion. Each arcuate portion has a first end connected to the inner ring portion and a second end connected to the outer ring portion. The second suspension has an inner ring portion fixed to the vibrating member and an outer ring portion that is coaxial with the inner ring portion and has a larger diameter than the inner ring portion. The outer ring portion is fixed to the casing at a position spaced apart from the vibrating member in the axial direction. The second suspension further has at least a pair of arcuate portions disposed in an annular space between the inner ring portion and the outer ring portion. Each arcuate portion has a first end connected to the inner ring portion and a second end connected to the outer ring portion. The arcuate portions of the first and second suspensions extend from the first end to the second end, respectively, in the same circumferential direction as seen from one side of the axial direction.

In the vibrator according to the present invention, the arcuate portions of the first and second suspensions extend from the first end, which is connected to the inner ring portion, to the second end, which is connected to the outer ring portion, in the same circumferential direction as seen from one side of the axial direction. Consequently, when the vibrating member is vibrated in the axial direction, turning forces applied to the vibrating member from the arcuate portions of the first and second suspensions are opposite to each other. Therefore, rotation of the vibrating member can be substantially suppressed.

In addition, the present invention provides a vibrator including a voice coil and a vibrating member adapted to vibrate along the axial direction of the voice coil upon application of an alternating current to the voice coil. The vibrator also includes first and second suspensions, which holds the vibrating member therebetween in the axial direction to enable said vibrating member to vibrate in said axial direction. The vibrator further includes a casing that houses the voice coil, the vibrating member, and the first and second suspensions. The first suspension has an outer ring portion fixed to the vibrating member and an inner ring portion that is coaxial with the outer ring portion and has a smaller diameter than the outer ring portion. The inner ring portion is fixed to the casing at a position spaced apart from the vibrating member in the axial direction. The first suspension further has at least a pair of arcuate portions disposed in an annular space between the inner ring portion and the outer ring portion. Each arcuate portion has a first end connected to the outer ring portion and a second end connected to the inner ring portion. The second suspension has an outer ring portion fixed to the vibrating member and an inner ring portion that is coaxial with the outer ring portion and has a smaller diameter than the outer ring portion. The inner ring portion is fixed to the casing at a position spaced apart from the vibrating member in the axial direction. The second suspension further has at least a pair of arcuate portions disposed in an annular space between the inner ring portion and the outer ring portion. Each arcuate portion has a first end connected to the outer ring portion and a second end connected to the inner ring portion. The arcuate portions of the first and second suspensions extend from the first end to the second end, respectively in the same circumferential direction as seen from one side of the axial direction.

In the above-described vibrator, the outer ring portion, which has a larger diameter, is connected to the vibrating member, and the inner ring portion, which has a smaller diameter, is connected to the casing, in the reverse relation to the first-mentioned vibrator. The arcuate portions of the first and second suspensions extend in the same circumferential direction in the same way as in the first-mentioned vibrator. Accordingly, when the vibrating member vibrates along the axis, rotation of the vibrating member about the axis is substantially suppressed.

The above-described vibrators may be arranged as follows. The casing has a cylindrical wall coaxial with respect to the voice coil, a bottom wall portion that closes one end of the cylindrical wall, and an end wall that closes the other end of the cylindrical wall. The vibrating member has a cup-shaped yoke having a cylindrical wall concentric with respect to the voice coil and a bottom wall portion that closes one end of the cylindrical wall. A magnet and a top plate are successively stacked on the bottom wall portion in the yoke. The vibrating member further has a weight fixed to the outer peripheral surface of the cylindrical wall of the yoke. A magnetic gap is formed between the top plate and the cylindrical wall of the yoke. The voice coil is fixed to the end wall of the casing in coaxial relation to the casing and concentrically inserted into the magnetic gap.

Specifically, the end wall of the casing may be a printed wiring board having a wiring pattern connected to the voice coil and terminals.

Preferably, the end wall of the casing and the top plate are provided with alignment holes. Preferably, the bottom wall portion of the yoke of the vibrating member has an alignment hole extending therethrough along the axis, and the inner ring portion of the second suspension has an alignment hole extending therethrough along the axis of the casing. These alignment holes are used for alignment between the constituent elements in manufacturing the vibrator. The second suspension may have a cylindrical portion connected to the outer peripheral edge of the outer ring portion and extending in the axial direction. The cylindrical portion is joined to the inner peripheral surface of the cylindrical wall of the casing.

The arrangement may be as follows. The cylindrical portion of the second suspension has an end edge facing the end wall of the casing, and the vibrator further includes an annular support member held between the end edge of the cylindrical portion of the second suspension and the end wall of the casing in contact with the inner peripheral surface of the casing. The outer ring portion of the first suspension and the support member are concentrically insert-molded together.

Further, the arrangement may be as follows. The end wall of the casing has an alignment hole extending therethrough along the axis of the casing. The top plate has an alignment hole extending therethrough along the axis of the casing. The bottom wall portion of the yoke of the vibrating member has an alignment hole extending through along the axis of the casing. The inner ring portion of the second suspension has an alignment hole extending therethrough along the axis of the casing. The second suspension has a cylindrical portion connected to the outer peripheral edge of the outer ring portion and extending in the axial direction. The cylindrical portion is joined to the inner peripheral surface of the cylindrical wall of the casing and has an end edge facing the end wall of the casing. The vibrator further includes an annular support member held between the end edge of the cylindrical portion of the second suspension and the end wall of the casing in contact with the inner peripheral surface of the casing. The outer ring portion of the first suspension and the support member are concentrically insert-molded together.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 1b is a sectional view taken along the line 1b-1b in FIG. 1a.

FIG. 2b is a sectional view taken along the line 2b-2b in FIG. 2a.

FIG. 3b is a sectional view taken along the line 3b-3b in FIG. 3a.

DESCRIPTION OF THE PREFERRED EMBODIMENTS

An embodiment of the vibrator according to the present invention will be explained below with reference to FIGS. 1a to 5.

Figure 1A:
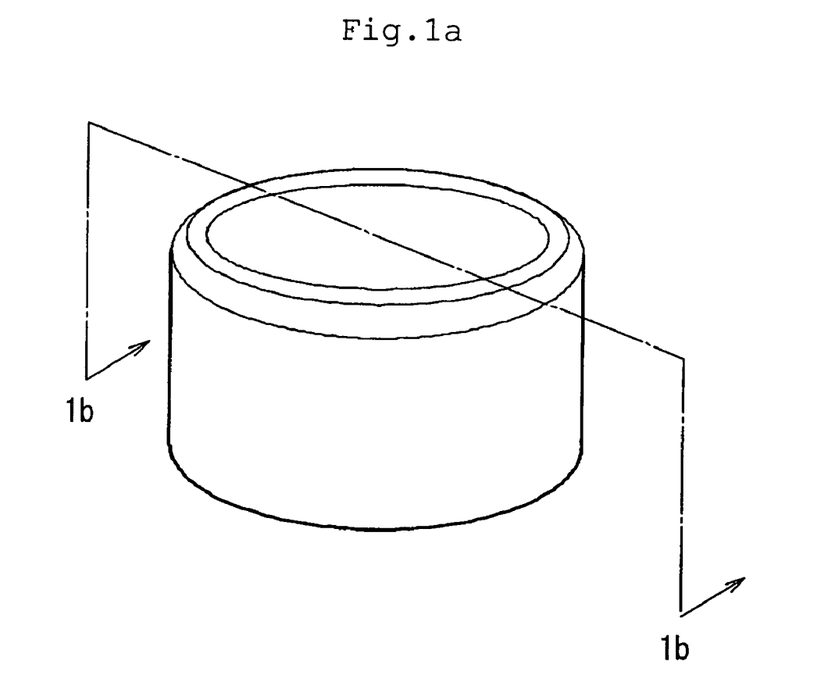
FIG. 1a is a perspective view of a vibrator according to an embodiment of the present invention.
Figure 1B:
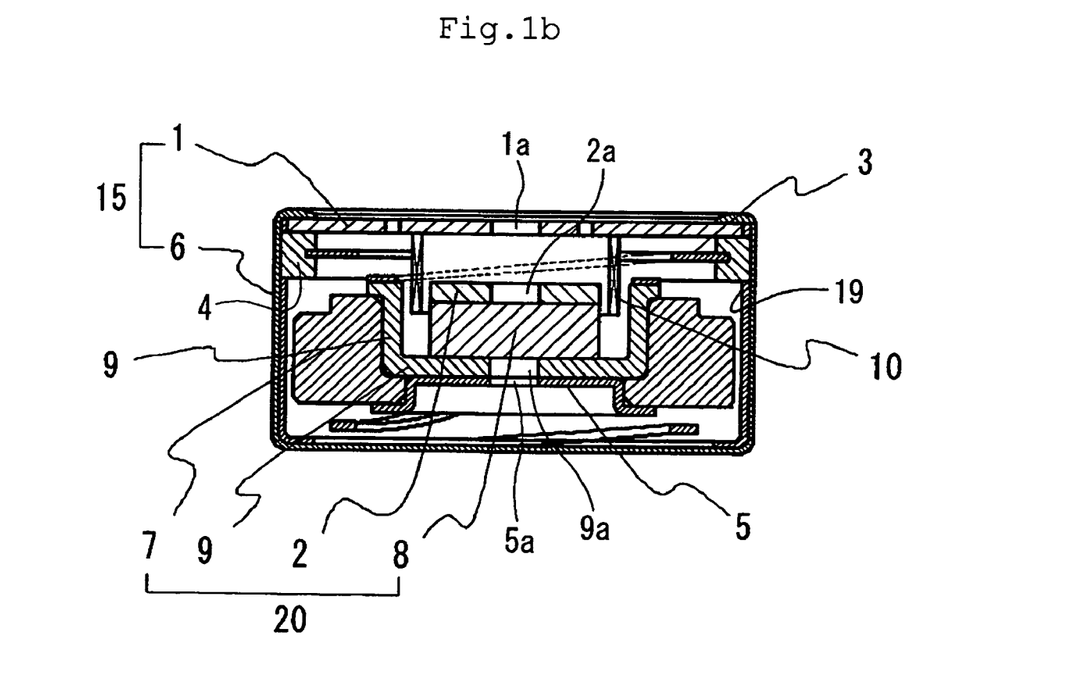

As shown in FIG. 1b, the vibrator according to the present invention has a cylindrical voice coil 10, a vibrating member 20, and first and second suspensions 3 and 5 that resiliently support the vibrating member 20. When the voice coil 10 is supplied with an alternating current, the vibrating member 20 is reciprocated in the axial direction of the voice coil 10, thereby generating vibrations. The voice coil 10, the vibrating member 20 and the first and second suspensions 3 and 5 are housed in a casing 15. The casing 15 is made of a cup-shaped member 6 that is coaxial with respect to the voice coil 10. The casing 15 further has a circular end plate 1 that supports the voice coil 10 and that closes the opening of the cup-shaped member 6.

The vibrating member 20 has a cup-shaped yoke 9 placed coaxially with respect to the voice coil 10. The vibrating member 20 further has a magnet 8 and a top plate 2 successively stacked in the yoke 9 in coaxial relation to the voice coil 10. The magnet 8 is secured to the bottom inner surface of the yoke 9. Further, an annular weight 7 is fixed to the outer periphery of the yoke 9. The voice coil 10 is inserted into a magnetic gap between the outer peripheral surface of the top plate 2 and the inner peripheral surface at the upper end of the yoke 9.

Figure 2A:
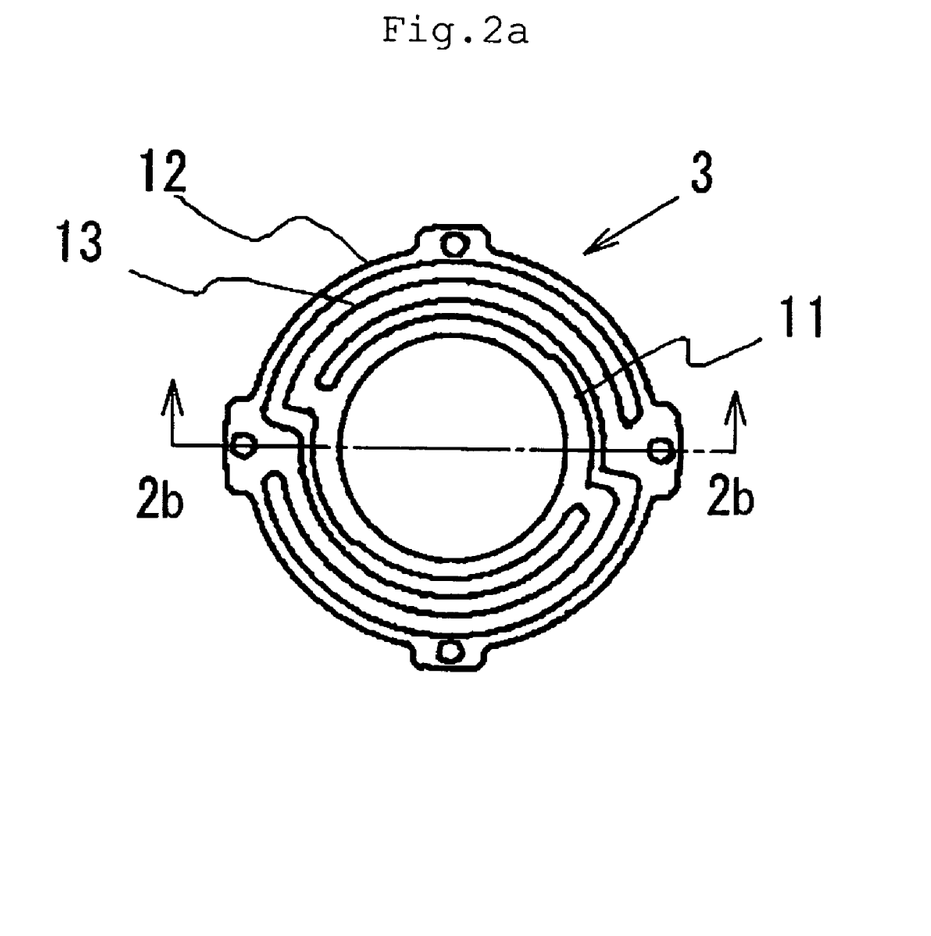
FIG. 2a is a plan view of a first suspension in the embodiment of the present invention.
Figure 2B:
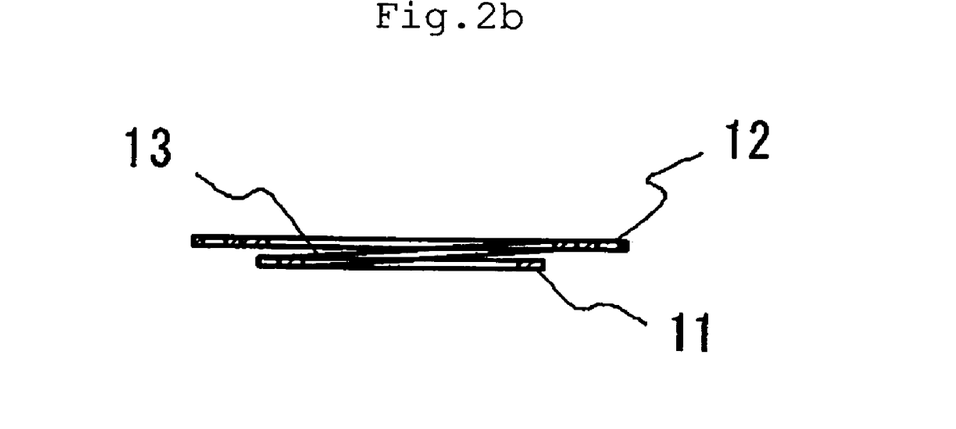

As shown in FIGS. 2a and 2b, the first suspension 3 has an inner ring portion 11, an outer ring portion 12, and arcuate portions 13 set in a space between the inner and outer ring portions 11 and 12 concentrically with respect to these ring portions 11 and 12. As shown in FIG. 1b, the inner ring portion 11 of the first suspension 3 is fixed in abutment against the upper end surface of the yoke 9. The outer ring portion 12 is supported by an annular support 4 secured to the inner peripheral surface of the cup-shaped member 6 of the casing 15 in contact with the end plate 1. The support 4 is insert-molded with the first suspension 3.

Figure 3A:
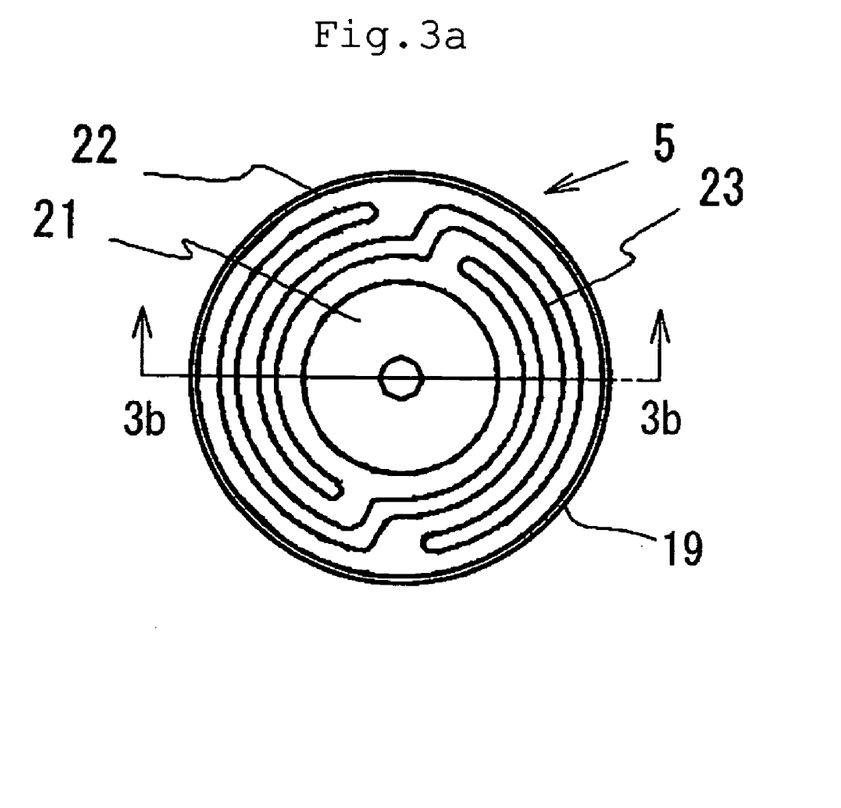
FIG. 3a is a plan view of a second suspension in the embodiment of the present invention.
Figure 3B:
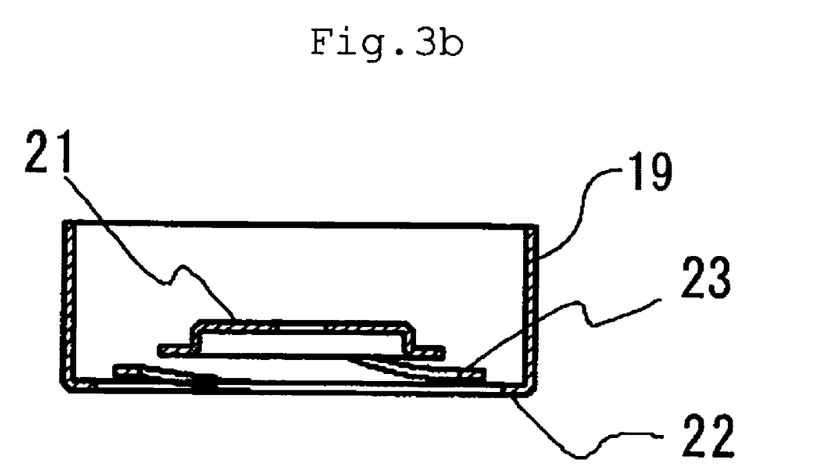

As shown in FIGS. 1b, 3a and 3b, the second suspension 5 is cup-shaped as a whole. The second suspension 5 has a cylindrical portion 19 fitted and secured to the inner side of the cup-shaped member 6 of the casing 15 as shown in FIG. 1b. A circular outer ring portion 22 is integrally formed on the bottom edge of the cylindrical portion 19. The second suspension 5 further has an inner ring portion 21 formed inside the cylindrical portion 19 concentrically with respect to the outer ring portion 22. Further, a pair of arcuate portions 23 is concentrically set in a space between the outer ring portion 22 and the inner ring portion 21. The inner ring portion 21 is secured in abutment against the bottom outer surface of the yoke 9. In the illustrated example, a disk-shaped member is integrally formed on the inner side of the inner ring portion 21. The disk-shaped member is also secured to the bottom of the yoke 9.

Figure 4:
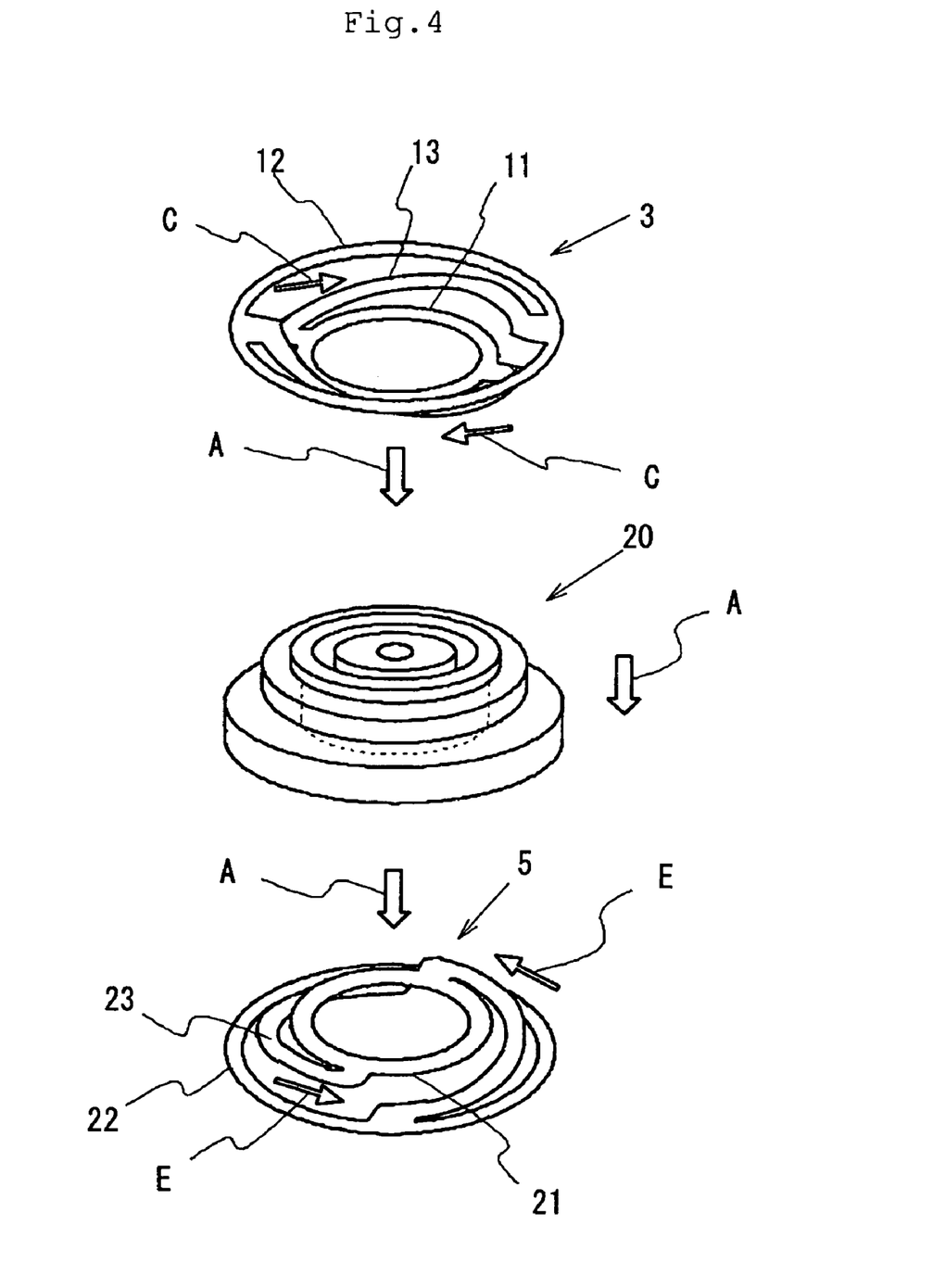
FIG. 4 is a perspective view showing the way in which the first and second suspensions are disposed in the embodiment of the present invention.

FIG. 2a is a view of the first suspension 3 as seen from above when it is installed as shown in FIG. 1b. Similarly, FIG. 3a is a view of the second suspension 5 as seen from above when it is installed as shown in FIG. 1b. As will be seen from these figures, the arcuate portions 13 and 23 of the first and second suspensions 3 and 5 extend from their joints with the outer ring portions 12 and 22 to their joints with the inner ring portions 11 and 21, respectively, in the same counterclockwise direction. Accordingly, when the vibrating member 20 reciprocates vertically, the joints of the arcuate portions 13 and 23 of the first and second suspensions 3 and 5 with the inner ring portions 11 and 21 are displaced circumferentially in the opposite directions to each other as seen in FIGS. 2a and 3a. More specifically, when the vibrating member 20 is displaced axially downward A, for example, as shown in FIG. 4, the first suspension 3 is expanded axially, so that the joint of each arcuate portion 13 with the inner ring portion 11 is displaced clockwise (in the direction of the arrow C). At the same time, the second suspension 5 is contracted axially, so that the joint of each arcuate portion 23 with the inner ring portion 21 is displaced counterclockwise (in the direction of the arrow E). Consequently, the inner ring portions 11 and 21 apply mutually opposite turning forces to the vibrating member 20 around the axis thereof. Accordingly, the turning forces cancel each other, and substantially no rotation occurs in the vibrating member 20.

Figure 5:
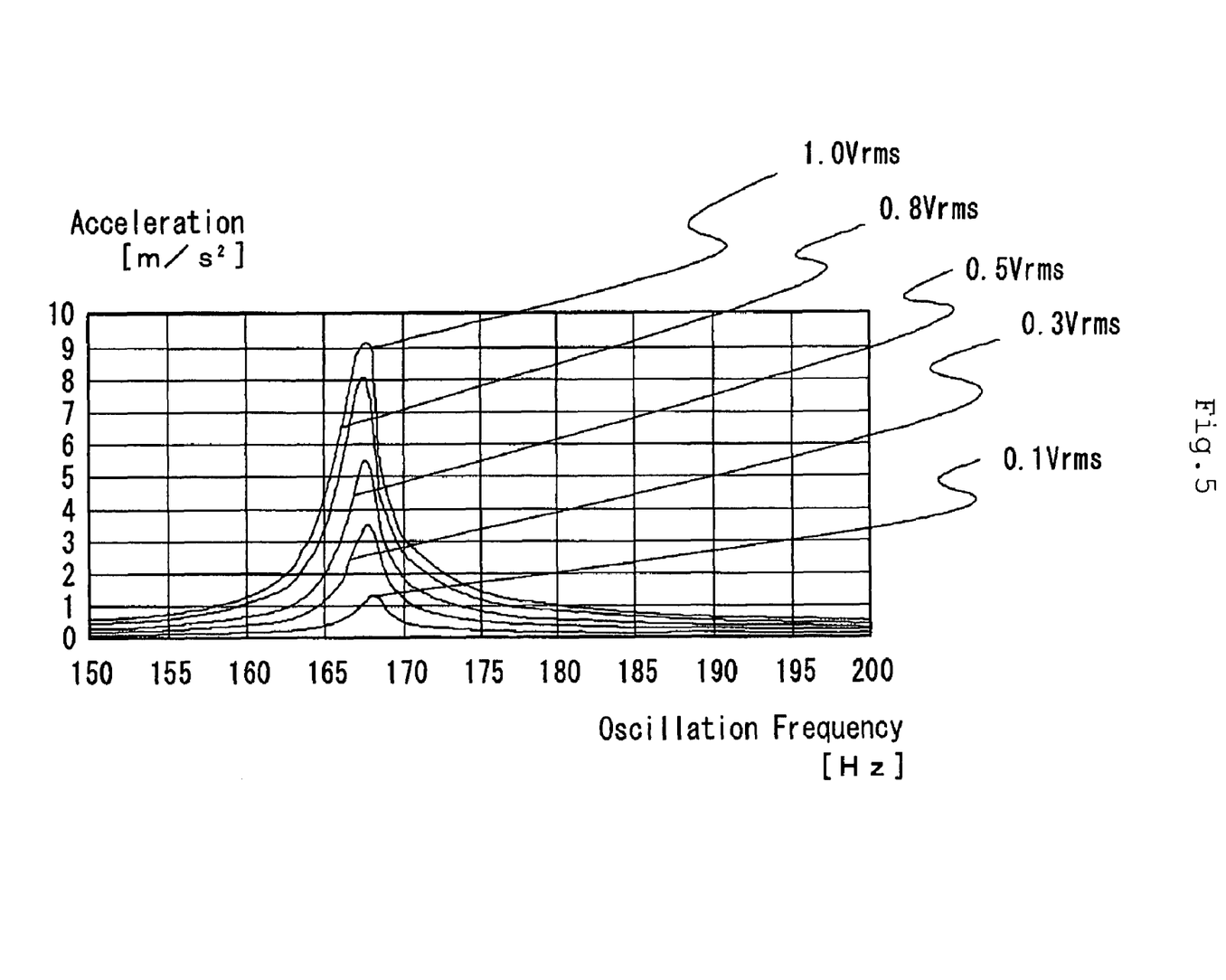
FIG. 5 is a graph showing the relationship between the acceleration and oscillation frequency of the vibrating member vibrated by the voice coil with respect to the voltage input to the voice coil of the vibrator according to the embodiment of the present invention.

FIG. 5 is a graph showing the relationship between the acceleration and oscillation frequency of the vibrating member vibrated by the voice coil with respect to the voltage input to the voice coil of the vibrator according to the embodiment. As will be seen from FIG. 5, the oscillation frequency of the vibrator according to the embodiment is independent of the effective voltage input to the voice coil, and a resonance occurs in the neighborhood of 167 Hz. In other words, in the vibrator according to the embodiment, a resonance of the vibrating member occurs at a predetermined frequency independently of changes in the input effective voltage.

In the embodiment, as illustrated in the figures, alignment holes 1a, 2a, 9a and 5a are provided in the end plate 1 of the casing 15, the top plate 2, the bottom wall of the yoke 9 and the center of the inner ring portion 21 of the second suspension 5, respectively. In manufacturing the vibrator, these alignment holes are used as follows.

First, a positioning pin studded in a first jig is inserted into the hole 1a of the end plate 1. The voice coil 10 is fitted around a second jig, and the positioning pin of the first jig is fitted into a hole provided in the second jig, thereby aligning the end plate 1 and the voice coil 10 with respect to each other. In this state, the two elements are bonded together.

The vibrating member 20 is formed in the same way as the conventional process. That is, the top plate 2 and the yoke 9 are placed on the upper and lower surfaces, respectively, of the magnet 8, and a third jig is inserted between the top plate 2 and the yoke 9 to align these elements with respect to each other. In this state, the elements are bonded together.

The second suspension 5 and the weight 7 are joined together in the same way as the conventional process. A fourth jig is inserted between the stepped portion of the weight 7 and the cylindrical portion 19 of the second suspension 5 to align these elements with respect to each other. In this state, the elements are welded together by laser welding or the like.

The second suspension 5 and the vibrating member 20 are joined together as follows. A pin of a fifth jig is fitted into the alignment hole 5a of the second suspension 5 and the alignment hole 9a of the yoke 9 to align these elements with respect to each other. In this state, the second suspension 5 is welded to the yoke 9 of the vibrating member 20 by laser welding or the like.

The first suspension 3 and the vibrating member 20 are joined together in the same way as the conventional process. The annular support 4, which is insert-molded with the first suspension 3, is fitted into the upper end opening of the cup-shaped member 6 of the casing 15, and thus the first suspension 3 and the vibrating member 20 are aligned with respect to each other. In this state, these elements are welded together by laser welding or the like.

The end plate 1 and the support 4 are bonded together in a state where a pin of a sixth jig is fitted into the hole 1a of the end plate 1 and the hole 2a of the top plate 2. Thus, the voice coil 10 and the magnetic gap of the vibrating member 20 are aligned with respect to each other. The outer diameter of the end plate 1 is somewhat made smaller so that the outer peripheral edge of the end plate 1 will not interfere with the opening edge of the cup-shaped member 6 of the casing 15.

Although one embodiment of the present invention has been described above, the present invention is not necessarily limited to the described embodiment but can be modified in a variety of ways without departing from the gist of the present invention. For example, although circular ring-shaped suspensions are used in the foregoing embodiment, by way of example, it should be noted that the present invention is not necessarily limited thereto, but the outer and inner ring portions may have other configurations, for example, a polygonal shape.

What is claimed is:

1. A vibrator comprising:
   a voice coil;
   a vibrating member adapted to vibrate along an axial direction of said voice coil upon application of an alternating current to said voice coil;
   first and second suspensions disposed to hold said vibrating member therebetween in the axial direction to enable said vibrating member to vibrate in said axial direction; and
   a casing that houses said voice coil, vibrating member and first and second suspensions;
   said first suspension having:
      an inner ring portion;
      an outer ring portion coaxial with said inner ring portion, said outer ring portion having a diameter that is larger than that of said inner ring portion, wherein one of said inner and outer ring portions is fixed to said vibrating member and said the other of said inner and outer ring portions is fixed to said casing at a position spaced apart from said vibrating member in said axial direction; and
      at least a pair of arcuate portions disposed in an annular space between said inner ring portion and said outer ring portion, each arcuate portion having a first end connected to said one of said inner and outer ring portions and a second end connected to said the other of said inner and outer ring portions;
   said second suspension having:
      an inner ring portion;
      an outer ring portion coaxial with said inner ring portion, said outer ring portion having a diameter that is larger than that of said inner ring portion, wherein one of said inner and outer ring portions is fixed to said vibrating member and the other of said inner and outer ring portions is fixed to said casing at a position spaced apart from said vibrating member in said axial direction; and
      at least a pair of arcuate portions disposed in an annular space between said inner ring portion and said outer ring portion, each arcuate portion having a first end connected to said one of said inner and outer ring portions, and a second end connected to said the other of said inner and outer ring portions,
   wherein said arcuate portions of said first and second suspensions extend from said first end to said second end, respectively, in the same circumferential direction as seen from one side of said axial direction.

2. A vibrator according to claim 1, wherein said one of said inner and outer ring portions of each of said first and second suspensions constitutes said inner ring portion, and said the other of said inner and outer ring portions of each of said first and second suspensions constitutes said outer ring portion.

3. A vibrator according to claim 1, wherein said one of said inner and outer ring portion of each of said first and second suspensions constitutes said outer ring portion, and said the other of said inner and outer ring portions of each of said first and second suspensions constitutes said inner ring portion.

4. A vibrator according to claim 1, wherein said casing has:
   a cylindrical wall coaxial with respect to said voice coil; and
   an end wall that closes one end of said cylindrical wall;
   said vibrating member having:
      a cup-shaped yoke having a cylindrical wall concentric with respect to said voice coil and a bottom wall portion that closes one end of said cylindrical wall;
      a magnet and a top plate-successively stacked on said bottom wall portion in said yoke; and
      a weight fixed to an outer peripheral surface of said cylindrical wall of said yoke,
   wherein a magnetic gap is formed between said top plate and said cylindrical wall of said yoke, and
   wherein said voice coil is fixed to said end wall of said casing in coaxial relation to said casing and concentrically inserted into said magnetic gap.

5. A vibrator according to claim 4, wherein said end wall of said casing comprises a printed wiring board having a wiring pattern connected to said voice coil and connecting terminals.

6. A vibrator according to claim 5, wherein said printed wiring board has an alignment hole extending therethrough along said axis of said voice coil.

7. A vibrator according to claim 6, wherein said top plate has an alignment hole extending therethrough along said axis.

8. A vibrator according to claim 4, wherein said bottom wall portion of said yoke of said vibrating member has an alignment hole extending therethrough along said axis, and said inner ring portion of said second suspension has an alignment hole extending therethrough along an axis of said casing.

9. A vibrator according to claim 4, wherein said second suspension has a cylindrical portion connected to an outer peripheral edge of said outer ring portion and extending in said axial direction, said cylindrical portion being joined to an inner peripheral surface of said cylindrical wall of said casing.

10. A vibrator according to claim 9, wherein said cylindrical portion of said second suspension has an end edge facing said end wall of said casing, said vibrator further comprising:
an annular support member held between said end edge of said cylindrical portion of said second suspension and said end wall of said casing while being in contact with said inner peripheral surface of said casing,
wherein said outer ring portion of said first suspension and said support member are concentrically insert-molded together.

11. A vibrator according to claim 4, wherein said end wall of said casing has an alignment hole extending therethrough along an axis of said casing;
said top plate having an alignment hole extending therethrough along the axis of said casing;
said bottom wall portion of said yoke of said vibrating member having an alignment hole extending through along the axis of said casing;
said inner ring portion of said second suspension having an alignment hole extending therethrough along the axis of said casing;
said second suspension having a cylindrical portion connected to an outer peripheral edge of said outer ring portion and extending in said axial direction, said cylindrical portion being joined to an inner peripheral surface of said cylindrical wall of said casing and having an end edge facing said end wall of said casing;
said vibrator further comprising:
an annular support member held between said end edge of said cylindrical portion of said second suspension and said end wall of said casing in contact with the inner peripheral surface of said casing,
wherein said outer ring portion of said first suspension and said support member are concentrically insert-molded together.

12. A vibrator according to claim 3, wherein said casing has:
a cylindrical wall coaxial with respect to said voice coil; and
an end wall that closes one end of said cylindrical wall;
said vibrating member having:
a cup-shaped yoke having a cylindrical wall concentric with respect to said voice coil and a bottom wall portion that closes one end of said cylindrical wall;
a magnet and a top plate successively stacked on said bottom wall portion in said yoke; and a weight fixed to an outer peripheral surface of said cylindrical wall of said yoke, wherein a magnetic gap is formed between said top plate and said cylindrical wall of said yoke, and wherein said voice coil is fixed to said end wall of said casing in coaxial relation to said casing and concentrically inserted into said magnetic gap.

13. A vibrator according to claim 12, wherein said end wall of said casing comprises a printed wiring board having a wiring pattern connected to said voice coil and connecting terminals.

14. A vibrator according to claim 13, wherein said printed wiring board has an alignment hole extending therethrough along the axis of said voice coil.

15. A vibrator according to claim 12, wherein said top plate has an alignment hole extending therethrough along said axis.

16. A vibrator according to claim 12, wherein said bottom wall portion of said yoke of said vibrating member has an alignment hole extending therethrough along said axis, and said inner ring portion of said second suspension has an alignment hole extending therethrough along said axis of said casing.

17. A vibrator according to claim 12, wherein said second suspension has a cylindrical portion connected to an outer peripheral edge of said outer ring portion and extending in said axial direction, said cylindrical portion being joined to an inner peripheral surface of said cylindrical wall of said casing.

18. A vibrator according to claim 17, wherein said cylindrical portion of said second suspension has an end edge facing said end wall of said casing, said vibrator further comprising:
an annular support member held between said end edge of said cylindrical portion of said second suspension and said end wall of said casing while being in contact with said inner peripheral surface of said casing,
wherein said outer ring portion of said first suspension and said support member are concentrically insert-molded together.

19. A vibrator according to claim 12, wherein said end wall of said casing has an alignment hole extending therethrough along said axis of said casing;
said top plate having an alignment hole extending therethrough along said axis of said casing;
said bottom wall portion of said yoke of said vibrating member having an alignment hole extending through along said axis of said casing; said inner ring portion of said second suspension having an alignment hole extending therethrough along said axis of said casing;
said second suspension having a cylindrical portion connected to an outer peripheral edge of said outer ring portion and extending in said axial direction, said cylindrical portion being joined to an inner peripheral surface of said cylindrical wall of said casing and having an end edge facing said end wall of said casing;
said vibrator further comprising:
an annular support member held between said end edge of said cylindrical portion of said second suspension and said end wall of said casing in contact with said inner peripheral surface of said casing,
wherein said outer ring portion of said first suspension and said support member are concentrically insert-molded together.

20. A vibrator comprising:
a vibrating member configured to convert electric energy into kinetic vibrations in a direction;
two suspensions configured to elastically suspend the vibrating member between them for vibrations, each of the two suspensions comprising two loop members and two or more connectors configured to elastically connect the two loop members at a distance in the vibrating direction; and
a casing configured to enclose the vibrating member and the two suspensions, one of the two loop members of each suspension is secured to the casing.

* * * * *